United States Patent
Abe et al.

[11] Patent Number: 5,911,160
[45] Date of Patent: Jun. 8, 1999

[54] ULTRASOUND DIAGNOSTIC APPARATUS

[75] Inventors: Yasuhiko Abe; Ryoichi Kanda, both of Otawara, Japan

[73] Assignee: Kabushiki Kaisha Toshiba, Kawasaki, Japan

[21] Appl. No.: 08/777,281

[22] Filed: Dec. 27, 1996

[30] Foreign Application Priority Data

Dec. 27, 1995 [JP] Japan .................................. 7-341798

[51] Int. Cl.$^6$ ................................................ G01N 29/00
[52] U.S. Cl. ........................................ 73/602; 128/660.07
[58] Field of Search ........................... 73/603, 611, 599, 73/600, 606, 602, 596, 609, 610, 618, 620, 627, 629, 861.25; 128/660.05, 660.06, 660.07, 661.07, 661.08, 661.09; 364/413.25

[56] References Cited

U.S. PATENT DOCUMENTS

| | | | |
|---|---|---|---|
| 4,202,215 | 5/1980 | Meyer | 73/599 |
| 4,545,250 | 10/1985 | Miwa | 73/602 |
| 4,723,553 | 2/1988 | Miwa et al. | 128/660 |
| 4,881,549 | 11/1989 | Rhyne | 128/660.07 |
| 5,121,364 | 6/1992 | O'Donnell | 367/98 |
| 5,265,217 | 11/1993 | Koukoutsis et al. | 395/2 |
| 5,315,687 | 5/1994 | Carayannis et al. | 395/2.28 |
| 5,349,524 | 9/1994 | Daft et al. | 364/413.25 |
| 5,349,525 | 9/1994 | Dunki-Jacobs et al. | 364/413.25 |
| 5,396,285 | 3/1995 | Hedberg et al. | 348/163 |
| 5,524,626 | 6/1996 | Liu | 128/660.06 |
| 5,609,155 | 3/1997 | Guracar | 128/661.09 |

FOREIGN PATENT DOCUMENTS

59-41731  10/1984  Japan .

*Primary Examiner*—Hezron Williams
*Assistant Examiner*—Richard A. Moller
*Attorney, Agent, or Firm*—Oblon, Spivak, McClelland, Maier & Neustadt, P.C.

[57] ABSTRACT

An ultrasound diagnostic apparatus having an ultrasound probe, a device for transmitting ultrasound to an subject through the ultrasound probe to receive echoes from the subject, a spectrum processor for approximating a spectrum of each of the echoes to a predetermined shape, and a unit for reconstructing an ultrasound image based on an output of the spectrum processor. The spectrums of the echoes are distorted by various reasons. There is a method for correcting a spectrum by enhancing only a high-frequency component of the echoes. Since this method is no more than to consider one reason, i.e., only frequency dependence of attenuation, a suitable correction cannot be made. According to the present invention, the spectrum is approximated to the predetermined shape, therefore the distortion of the spectrum caused by various reasons can be suitably corrected.

20 Claims, 12 Drawing Sheets

FIG. 1C PRIOR ART fo: CENTER FREQUENCY ⇒ fo(9cm) > fo(6cm) > fo(3cm)
BW: BANDWIDTH ⇒ BW(9cm) > BW(6cm) > BW(3cm)

FIG. 8C (INPUT SPECTRUM) | (OUTPUT SPECTRUM)

ULTRASOUND DIAGNOSTIC APPARATUS

BACKGROUND OF THE INVENTION

Figure 1A:
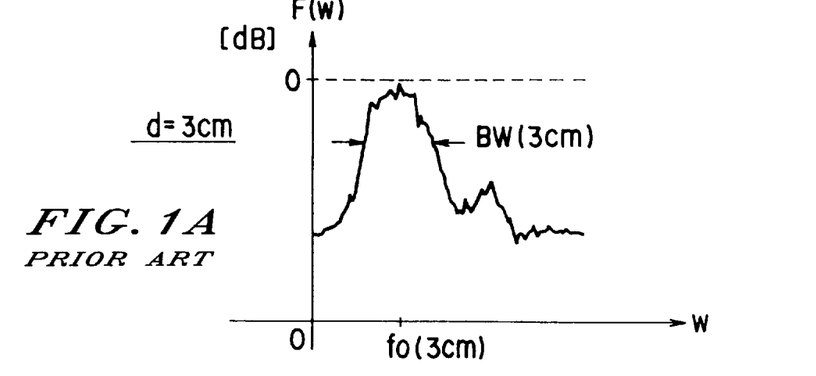
FIG. 1 is a view showing a spectrum of three echoes that reflecting depths.
Figure 1B:
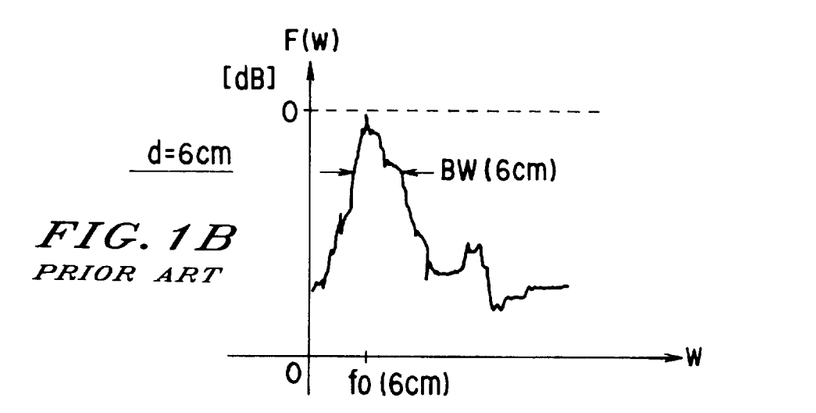
Figure 1C:
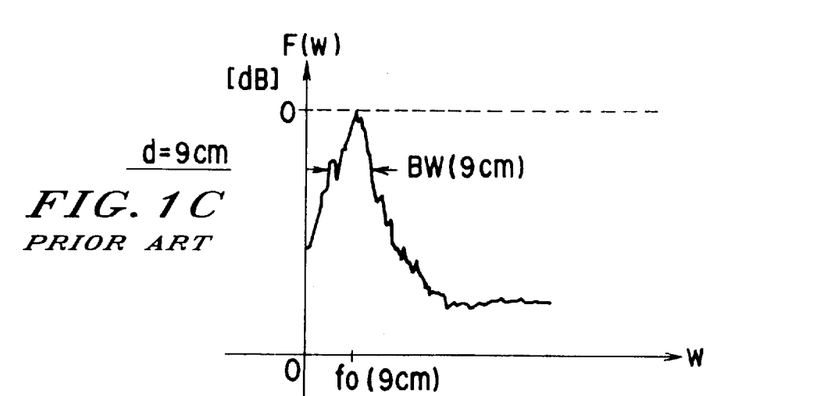

The present invention relates to an ultrasound diagnostic apparatus for reconstructing an image based on echo signals obtained by scanning a cross-section of a subject with an ultrasound beam The ultrasound spectrums are distorted by various causes, for example, attenuation. The attenuation has a frequency dependence Specifically, as shown in FIG. 1, the attenuation does not constantly act on the every frequency component. In other words, the attenuation acts on the high frequency components strongly and the low frequency components weakly. The longer the propagation distance becomes (i.e., as the reflecting depth becomes deeper), the larger the distortion of the spectrum becomes (i.e., the depth dependence increases).

Conventionally, the distortion of the spectrum due to attenuation was corrected by enhancing the high frequency components having a large attenuation.

However, in the conventional correcting method, the correction accuracy was low. The reason can be explained as follows.

In the conventional ultrasound diagnostic apparatus, a piezoelectric element is used as an interface between an electrical signal and an ultrasound signal. The piezoelectric element receives a voltage causing it to oscillate at high frequency and emit ultrasound. The spectrum of the emitted ultrasound is determined by convolution of the spectrum of the high frequency voltage and the sensitivity characteristic of the piezoelectric element. The sensitivity characteristic of the piezoelectric element is defined as a frequency dependence in which the transform efficiency to the ultrasound from the electrical signal is changed according to the frequency.

Figure 2:
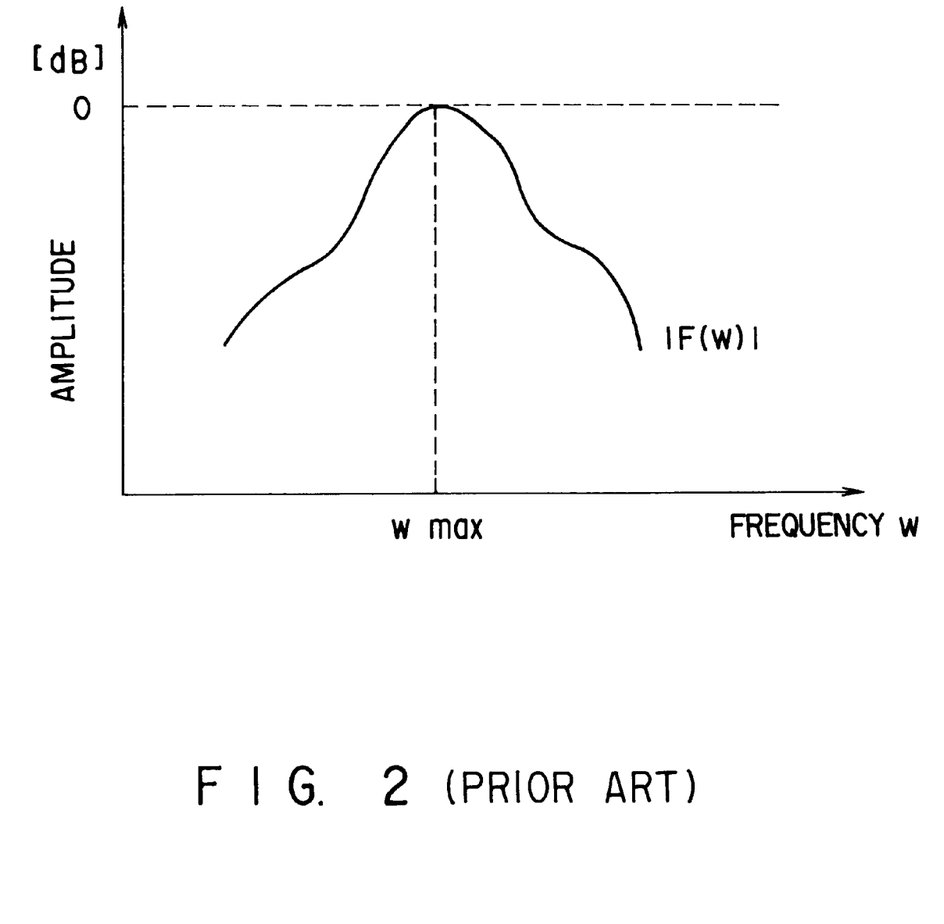
FIG. 2 is a view showing a probe frequency characteristic.

Regarding the sensitivity characteristic of the piezoelectric elements the number of cases in which a relatively simple shape is shown as FIG. 2 (a sine curve is drawn) is small. Generally, the complicated shape is shown. Therefore, the transformation to the ultrasound signal from the electrical signal deforms the spectrum of the ultrasound The spectrum also deforms due to the above-mentioned attenuation and the transformation to the electrical signal from the echo.

Due to this deformation complicated distortion of the spectrum cannot be sufficiently corrected by simply enhancing the high frequency components. This problem becomes significant in the probe, which has been recently developed in consideration of a Doppler mode which deals with a blood flow echo whose amplitude is considerably smaller than a tissue echo.

In the Doppler mode, the low frequency ultrasound whose attenuation is smaller is advantageous. The sensitivity peak of the probe tends to be shifted to the low frequency to effectively generate the ultrasound with a low frequency. In the B-mode, unlike the Doppler mode, a spatial resolution is regarded as important. The spatial resolution generally is improved as the frequency becomes high. As a result, in order to achieve the high-sensitivity Doppler mode and the high-spatial resolution B-mode, a situation in which a probe having a sensitivity peak in a low frequency and is driven by a voltage having a high frequency may occur. This state enlarges the distortion of the spectrum in the B-mode, so that the correction accuracy of the spectrum is largely lowered.

BRIEF SUMMARY OF THE INVENTION

An object of the present invention is to provide an ultrasound diagnostic apparatus capable of correcting a spectrum with high accuracy According to the present inventions there is provided an ultrasound diagnostic apparatus comprising:

an ultrasound probe;

means for transmitting ultrasound to a subject through the ultrasound probe to receive echoes from the subject;

a spectrum processor for approximating a spectrum of each of the echoes to a predetermined shape in accordance with depths; and means for reconstructing an ultrasound image based on an output of the spectrum processor.

The spectrum of the echo is distorted by various causes. The conventional method for correcting a spectrum by enhancing only a high-frequency component of the echo considers only one such cause; (i.e. only frequency dependence of attenuation) suitable correction cannot be made. According to the present invention, the spectrum is approximated to the predetermined shape, therefore the distortion of the spectrum caused by various causes can be suitably corrected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specifications illustrate presently preferred embodiments of the invention and, together with the general description given above and the detailed description of the preferred embodiments given below, serve to explain the principles of the invention.

DETAILED DESCRIPTION OF THE INVENTION

The following will explain the embodiments of the present invention with reference to the accompanying drawings.

First Embodiment

Figure 3:
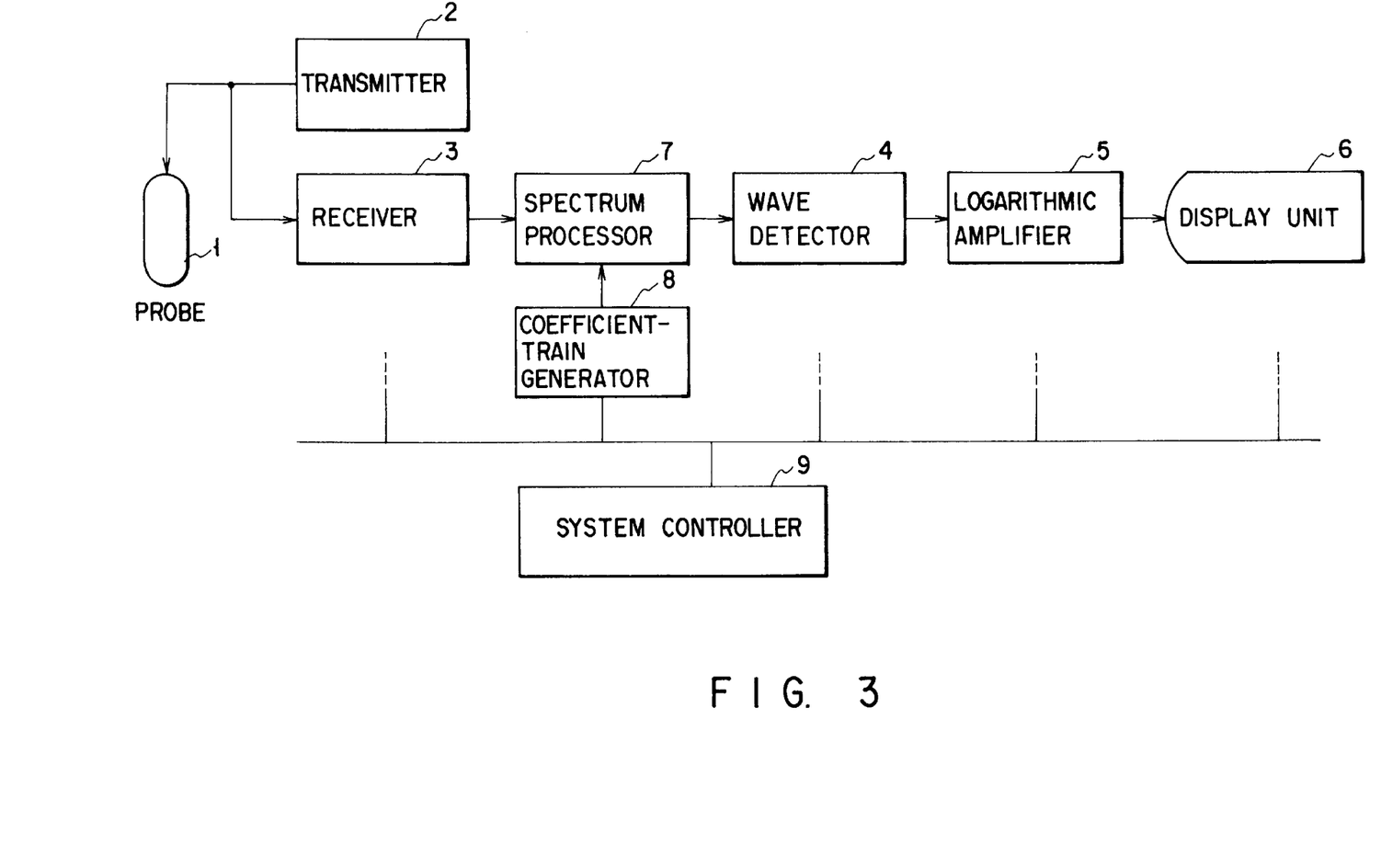
FIG. 3 is a block diagram showing the structure of an ultrasound diagnostic apparatus according to a first embodiment of the present invention.

FIG. 3 shows the structure of the ultrasound diagnostic apparatus according to the first embodiment of the present invention. A system controller 9 is a control center of the ultrasound diagnostic apparatus. An ultrasound probe 1 is an interface between an electrical signal and an ultrasound signal. A plurality of piezoelectric elements are arranged on the top end of the probe 1. The arrangement of piezoelectric elements is designed in accordance with any of a sector scan, a linear scan, and a convex scan. In the following explanation, the arrangement of piezoelectric elements is designed in accordance the sector scan.

A transmitter 2 transmits ultrasound pulses to an subject through the probe 1, and a receiver 3 receives echoes from the subject.

The transmitter 2 comprises a clock generator, a rate pulse generator, a transmission delay circuit, and a pulsar (not shown). The clock generator generates clock pulses. The rate pulse generator divides a clock pulse to generate rate pulses. The transmission delay circuit converges the ultrasound in a beam shapes and provides delay time, which is necessary to oscillate the ultrasound beads to each rate pulse. The pulsar is triggered by each rate pulse to supply high-frequency voltage pulses to the probe 1. As a result, an ultrasound pulse is generated from the probe 1.

The ultrasound pulse is emitted into in the subject, and reflected at boundary surfaces of acoustic impedance, sequentially. The echoes are returned to the probe; and converted to electrical signals by the piezoelectric elements of the probe 1 to be fetched to the receiver 3. This fetching is continued until the next ultrasound pulse is transmitted. This continuation period is called the rate period, which is given by a reciprocal number of the rate frequency.

The receiver 3 comprises a preamplifier, an analog-digital converter, and a digital beam former to add the electrical signals fetched during the rate period. As a result, one echo signal having directivity is generated.

A spectrum processor 7 is a digital filter to convolute coefficient-trains to the portions of the echo signals, respectively. As a result, the shape of the spectrum of the echo signal output from the receiver 3 is approximated to an ideal shape having no distortion. In the present invention, this process is called "correction." This correction should be clearly distinguished from the conventional correction in which the component of the specific band (high frequency component) is enhanced to deform the shape of the spectrum.

A coefficient-train generator 8 holds coefficient-trains each having a plurality of coefficients (N number of coefficients). One of the coefficient-trains is used selectively in accordance with the depth of the each portion of the echo signal. The pattern of each coefficient-train determines the filter characteristic of the spectrum processor 7. Each of the coefficient-trains has a different filter characteristic. Different coefficient trains are selected according to depths of portions.

A wave-detector 4 detects an envelope of an echo signal whose spectrum is corrected to produce original data of a tissue tomographic image (B-mode image). A logarithmic amplifier 5 logarithmically amplifies original data to produce secondary data for display A display unit 6 displays the tissue tomographic image (B-mode image) based on secondary data.

The following will specifically explain the spectrum processor 7 and the coefficient-train generator 8, which are the characteristic structural elements of this embodiment.

Figure 4:
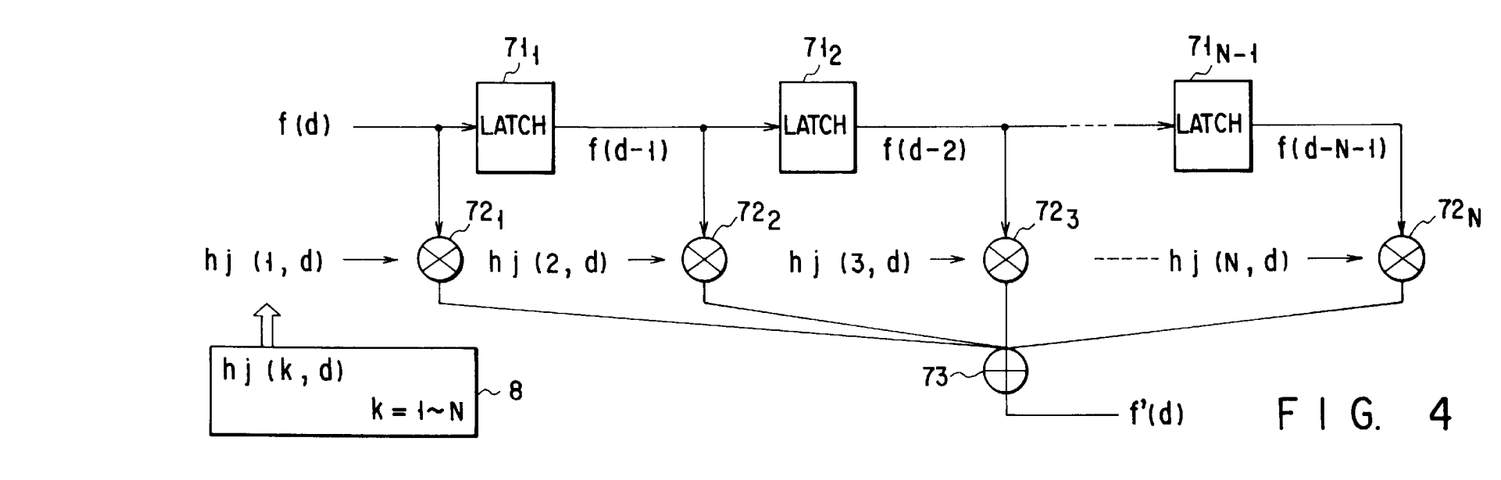
FIG. 4 is a block diagram showing the structure of a spectrum processor of FIG. 3.

As shown in FIG. 4, the spectrum processor 7 can be realized by an FIR (finite impulse response) type digital filter. The portions of the echo signals, which are convoluted on the coefficient-trains, correspond to an N number of data items to be continuously output from the receiver 3, respectively. The N number of data items are simultaneously supplied to an N number of multipliers ($72_1$, $72_2$, ... $72_N$) by data latch circuit ($71_1$, $71_2$, ... $72_{N-1}$) to be multiplied by an N number of coefficients, respectively. The N number of data items multiplied by the coefficients are added by an adder 73. As a results the spectrums are corrected. This spectrum process can be expressed by the following equation.

$$f'(d) = \sum_{k=1}^{N} hj(k, d) \cdot f(d - k + 1)$$

wherein f(d) is an input data item, hj(kd) is a coefficients and f'(d) is an output data item It is the coefficient train generator 8, which supplies the coefficient-trains to the spectrum processor 7.

Figure 5:
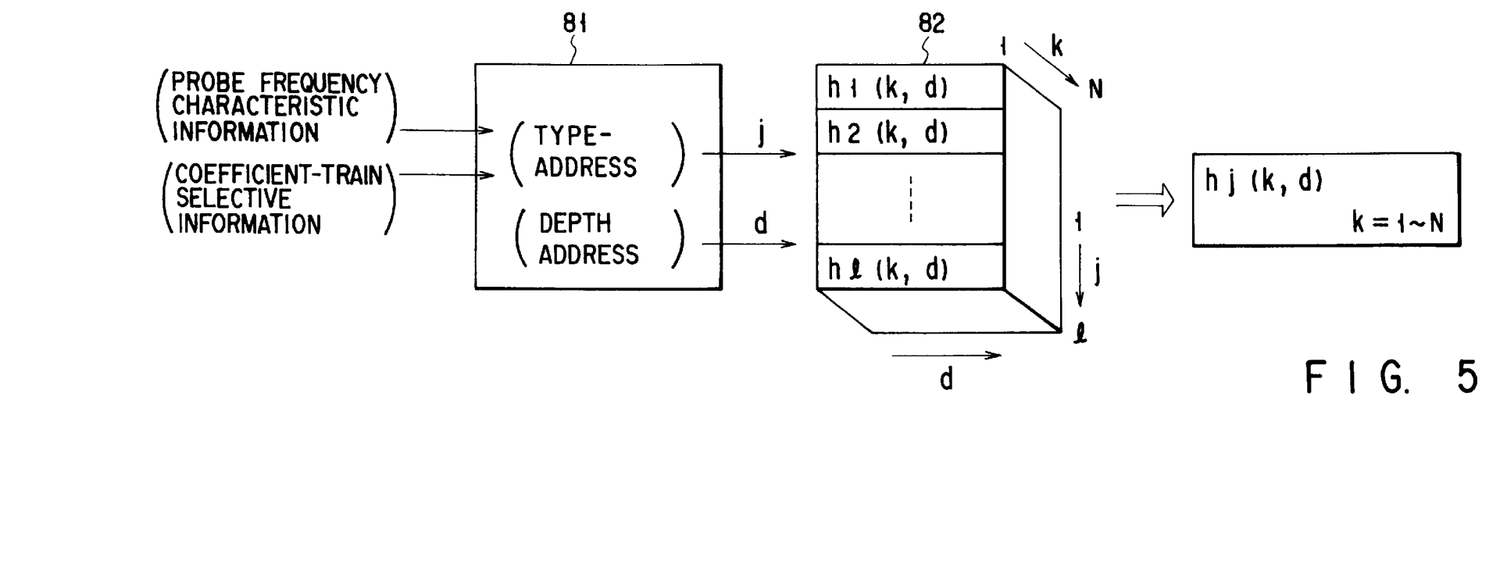
FIG. 5 is a block diagram showing the structure of a coefficient-train generator of FIG. 3.

As shown in FIG. 5, the coefficient-train generator 8 comprises an address generator 81, and a coefficient-train storing section 82. The coefficient-train storing section 82 stores a plurality of coefficient-trains each having a different filter characteristic. These coefficient-trains are classified into l types, depending on the difference of the filter characteristic in the tendency (kind of functions showing an ideal spectrum). The filter characteristics in a same type gradually differ in accordance with the reflecting depth(d).

The address generator 81 outputs a type address and a depth address, which corresponds to the depth(d) of data item f(d), to the coefficient-train storing section 82 in synchronous with the supply of data items f(d) to the spectrum processor 7. The type, address is determined in accordance with frequency characteristic information of the probe 1, which is input from a console (not shown), and with coefficient-train selective information. The coefficient-train selective information reflects the operator's taste and judgment on the correction.

The coefficient-train storing section 82 reads out N coefficients, which are stored in a location specified by the type address and the depth address, to send to the multipliers ($72_1$ to $72_N$), respectively. Thus, the coefficient-trains are changed in accordance with the depth. In other words, the filter characteristic is changed according to the depth, the depth dependence of the distortion of the spectrum is compensated, and the suitable correction can be made in accordance with the depth. Moreover, the coefficient-trains can be changed in accordance with coefficient-train selective information. The operator's taste and judgment can be reflected on the correction.

The pattern of the coefficient-train can be obtained as follows.

According to the present invention, the correction is a process for approximating the shape of the spectrum to an ideal shape. Even in the conventional method for enhancing the high-frequency component, the spectrum may be approximated to an ideal shape. However, in such a conventional case, the approximation of the spectrum is limited to the amplification of at least the high-frequency portion.

Figures 6A, 6B:
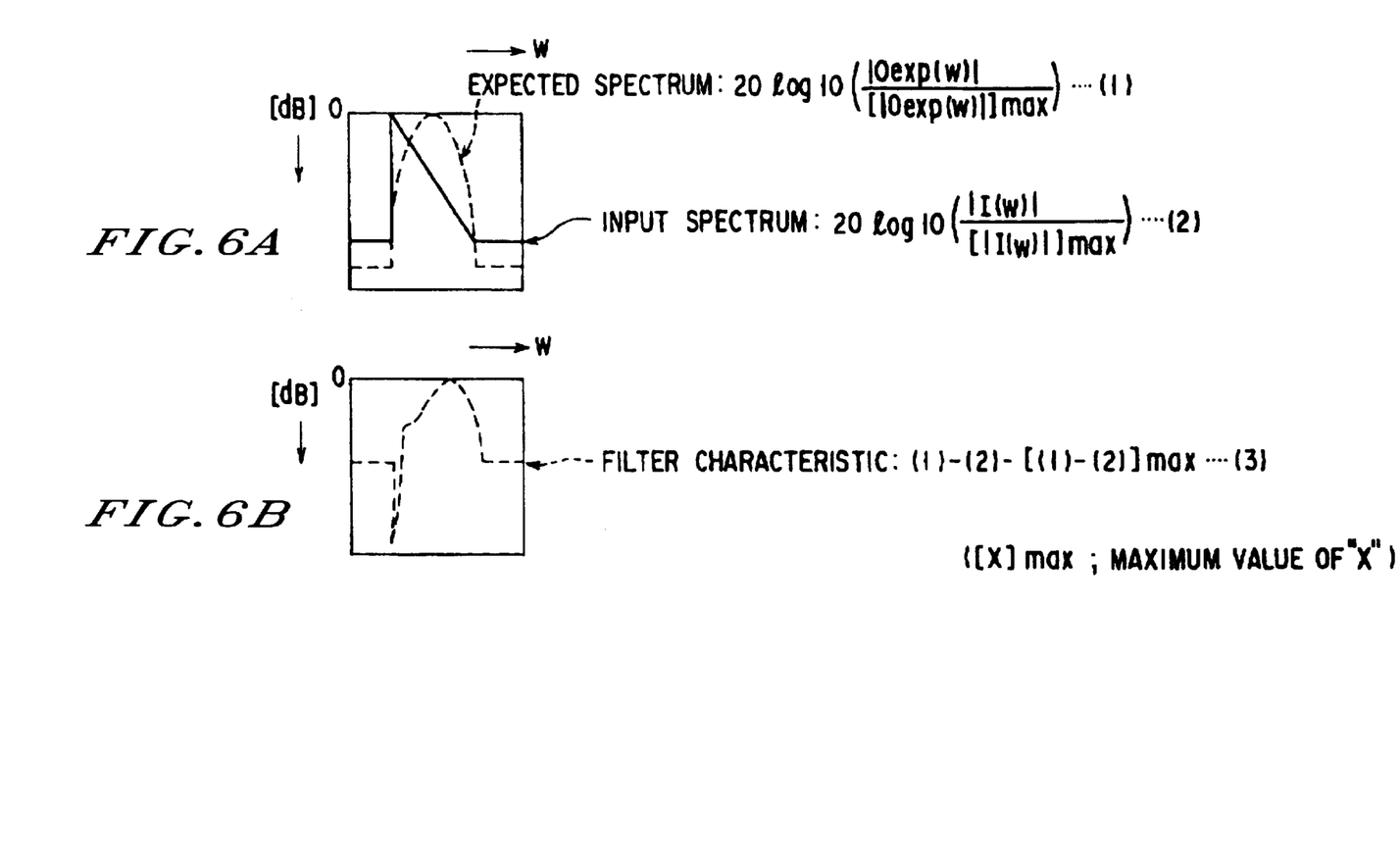
FIG. 6 is a view explaining the decision of a filter characteristic.

According to the present invention, as shown in FIG. 6, filter characteristic F (ω, d) can be decided by the following equation based on an ideal spectrum Oexp (ω, d) and a standard spectrum E [I(ω, d))].

$$F(\omega, d) = O\exp(\omega, d)/E[I(\omega, d)].$$

wherein ω: frequency and d: depth.

The standard spectrum can be obtained by the following way. Specifically, a large number of spectrums is collected from the subjects each having a standard figure or phantoms, and the collected spectrums are averaged to obtain the standard spectrum.

Figure 7A:
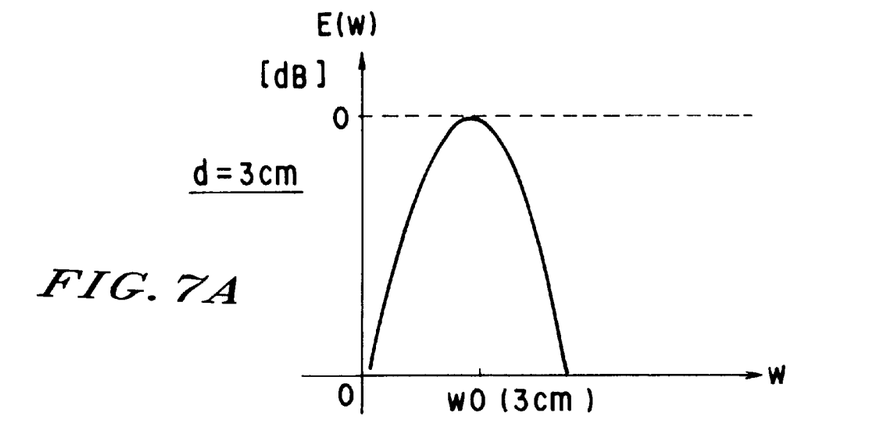
FIG. 7 is a view showing three ideal echo spectrums each having a different reflecting depth.
Figure 7B:
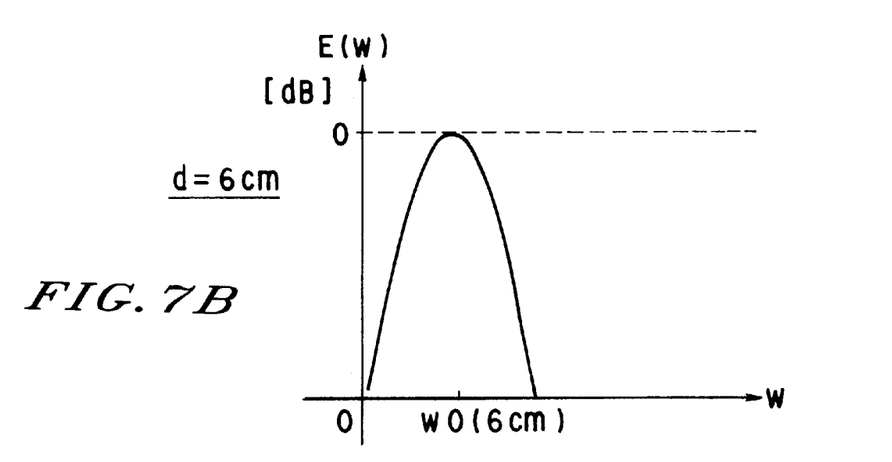
Figure 7C:
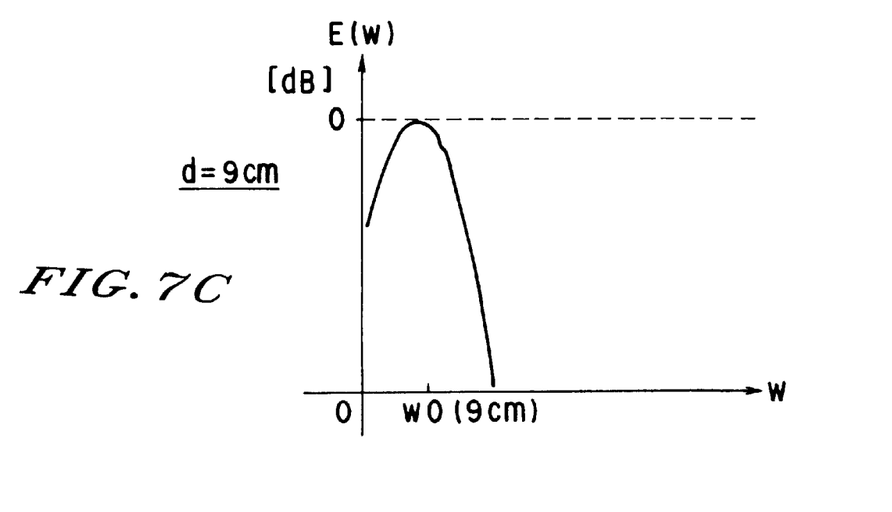

As an ideal spectrum, which influences the quality of image, a spectrum, which is expressed by Gaussian function as shown in FIG. 7.

$$\text{Gaussian function: } f(t) = \exp[-vt^2]$$

As is known, a Gaussian curve can be maintained even on a frequency axis and a time axis.

$$F(\omega) = \sqrt{(\pi/v)} \cdot \exp[-\omega^2/4v]$$

Thus, an output of the spectrum processor (FIR type digital filter) 7 is also Gaussian-curve, and its finite impulse response can realize the reduction of the tailing, and that of the deterioration of distance resolution.

Figure 8A:
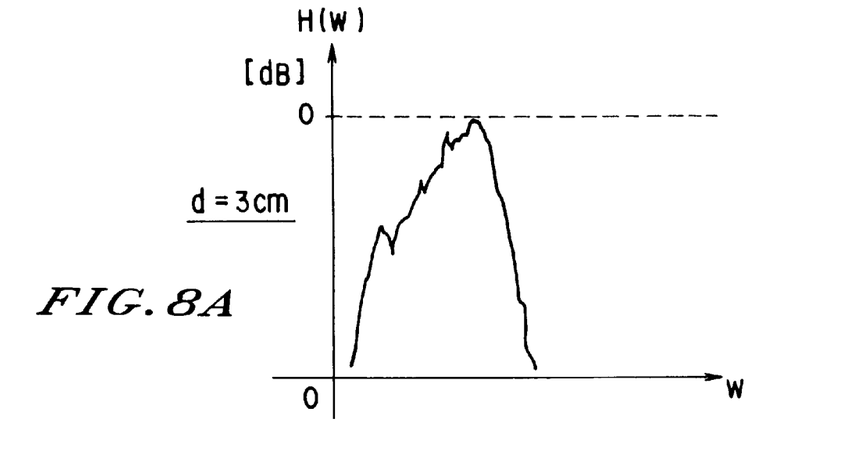
FIG. 8 is a view showing three filter characteristics each having a different reflecting depth.
Figure 8B:
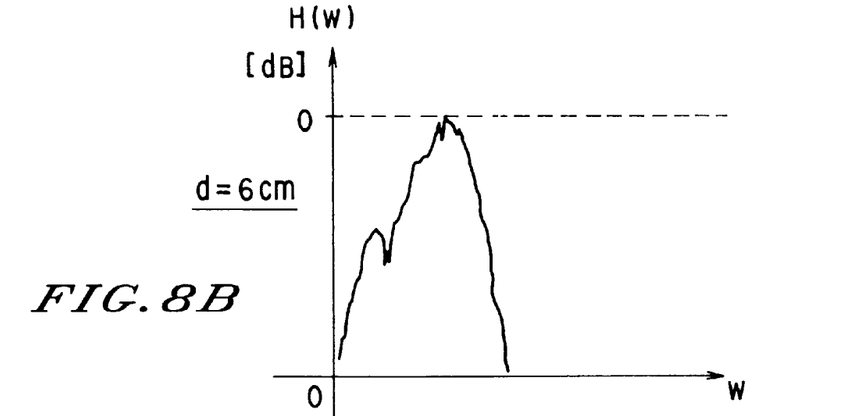
Figure 8C:
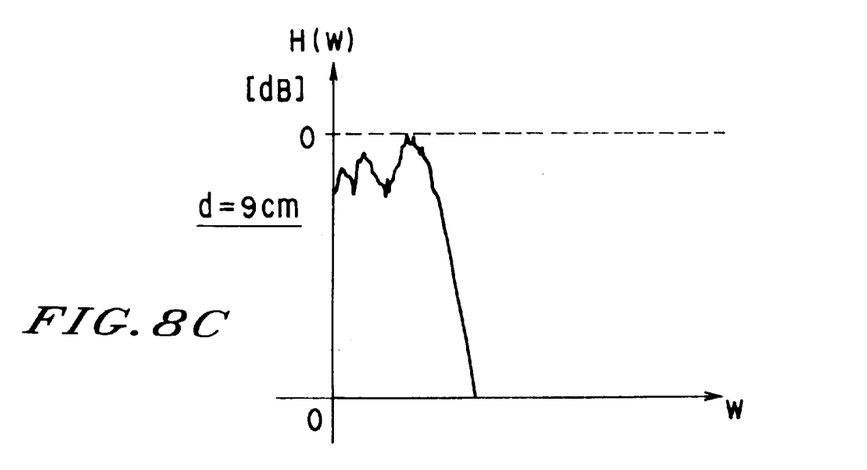
Figure 9A:
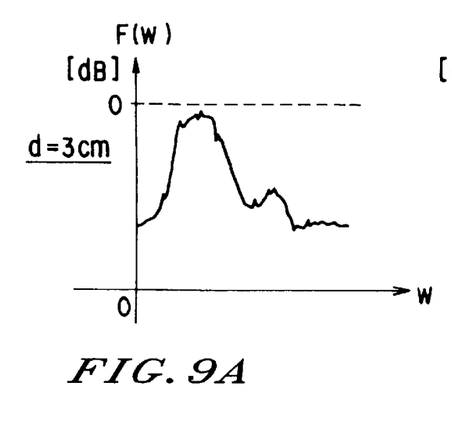
FIG. 9 is a view showing I/O spectrums of the spectrum processor of FIG. 3.
Figure 9B:
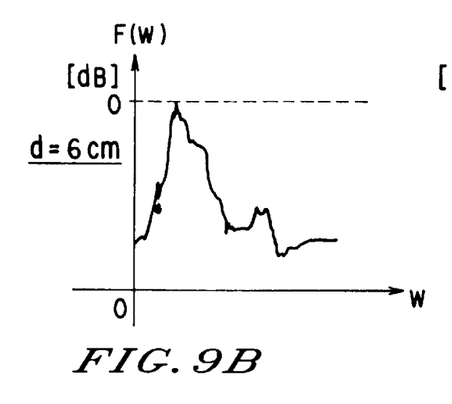
Figure 9C:
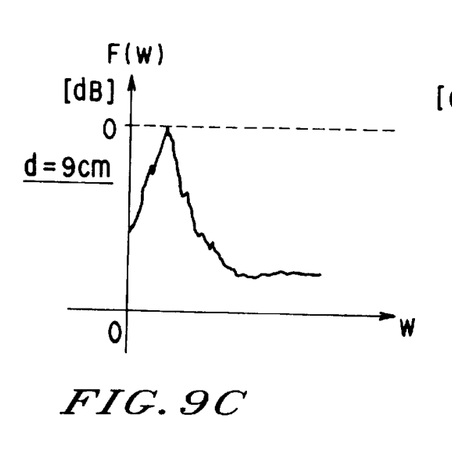
Figure 9D:
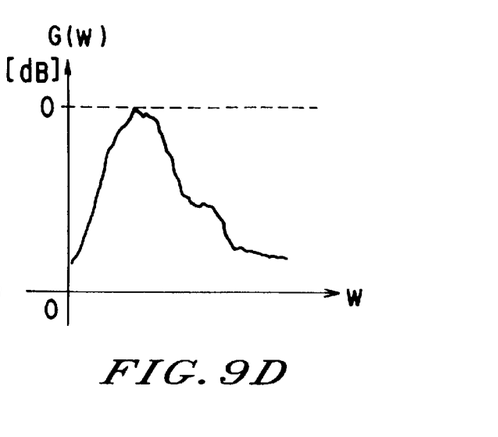
Figure 9E:
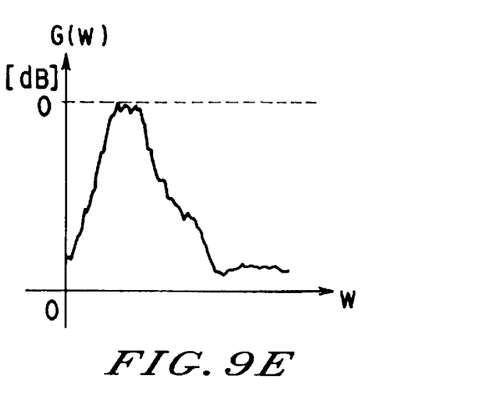
Figure 9F:
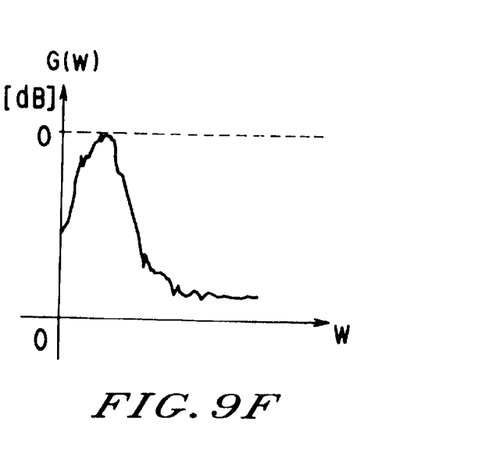

Thus, the determined filter characteristic F(ω, d) provides a multi-peak waveform as shown in FIG. 8. If such a filter is formed of an analog circuit, the scale becomes large. The filter is preferably formed of a digital circuit.

The reason for using the FIR type digital filter in the spectrum processor 7 is as follows.

Specifically, a transient response can be easily controlled to be smaller than an IIR type digital filter. The transition response occurs when the filter characteristic is gradually changed in accordance with the depth.

For obtaining an N number of coefficients h(k, d) from the above-obtained filter characteristic F(ω, d), F(ω, d) may be inverse Fourier-transformed to extract an N number of impulse system-trains, as coefficient-trains, dispersively from the waveform. In the above-obtained impulse system-trains, since F(ω, d) does not always have symmetrical shapes, a linear phase characteristic cannot be easily obtained. To ensure the linear phase characteristic and reduce the distortion of the waveform as much as possible, the following method can be considered.

Specifically, a one-side waveform of F(ω, d) is folded to form a symmetrical F'(ω, d). F'(ω, d) are inversely Fourier-transformed to extract an N number of impulse system-trains, as coefficient-trains, dispersively from the waveform. FIG. 9 shows a spectrum (output spectrum) corrected by the coefficient-train obtained by this method.

Figure 10:
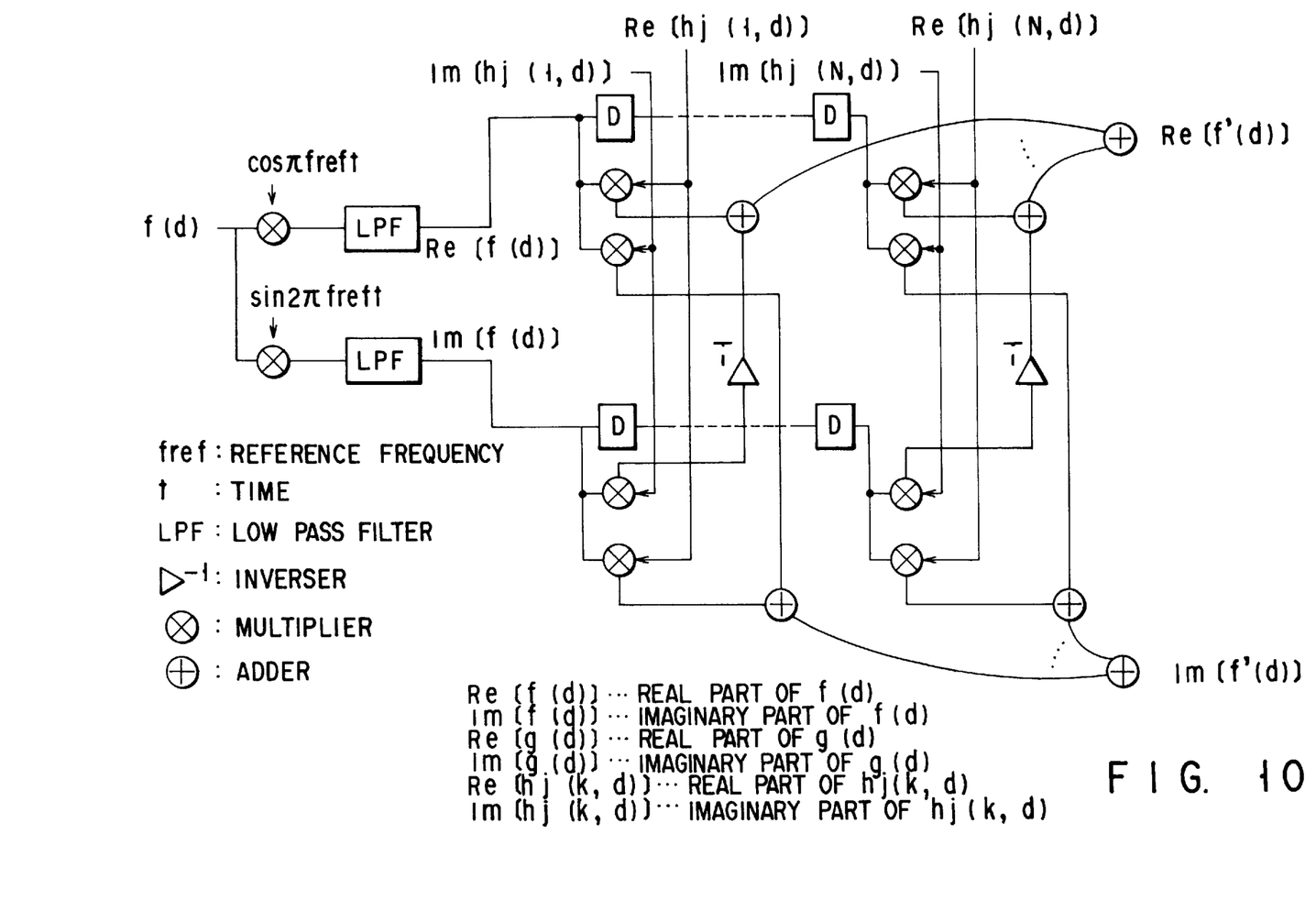
FIG. 10 is a block diagram showing an alternative structure of the spectrum processor.

Of, course, a method for filtering by the coefficient-train can be directly obtained from F(ω, d) without performing the above-mentioned preprocess. Since the coefficient-train directly obtained from F(ω, d) can be obtained as a complex numbers the spectrum processor 7 comprises a complex-type digital filter as shown in FIG. 10. In the case of the coefficient-train obtained from F'(ω, d), the approximation to the ideal spectrum of the one-side portion of the spectrum is low. In the case where the coefficient-train directly obtained from F(ω, d) is used and the spectrum processor 7 comprises the complex type filter, the approximation to the ideal spectrum of both sides portions of the spectrum can be obtained. As a result, an effect for removing noise components can be expected. A signal whose spectrum is corrected by the complex-type filter can be expressed by the following equation.

$$f'(d) = \sum_{k=1}^{N} \{Re[hj(k, d)] + jIm[hj9k, d)]\} \cdot$$

$$\{Re[f(d-k+1)] + jIm[f(d-k+1)]\}$$

$$= \sum_{k=1}^{N} \{Re[hj(k, d)] + Re[f(d-k+1)] -$$

$$Im[hj(k, d)] \cdot Im[f(d-k+1)]\} +$$

$$j\sum_{k=1}^{N} \{Re[hj(k, d)] + Im[f(d-k+1)] +$$

$$Im[hj(k, d)] \cdot Re[f(d-k+1)]\}$$

$$= Re[g(d)] + jIm[g(d)]$$

According to the above-mentioned embodiment, the spectrum is approximated to the ideal shape. As a result, as compared with the conventional method for enhancing only the high-frequency components, the accuracy of correction can be improved.

The spectrum is corrected by the coefficient-train obtained beforehand based on the standard spectrum and the ideal spectrum. Due to this, if the actual spectrum of the subject is largely inconsistent with the standard spectrum, depending on the subject, there is possibility that the corrected spectrum will not be approximated to the ideal spectrum well. To reduce this problem, in this embodiment, various types of coefficient-trains are obtained from various types of the standard spectrums so that the operator can select a suitable type of spectrum Second Embodiment In the first embodiment, the spectrum was corrected by the calculation on the time axis. However, the spectrum may be corrected by the calculation on the frequency axis. The following will show the structure in which the spectrum may be corrected by the calculation on the frequency axis.

Figure 11:
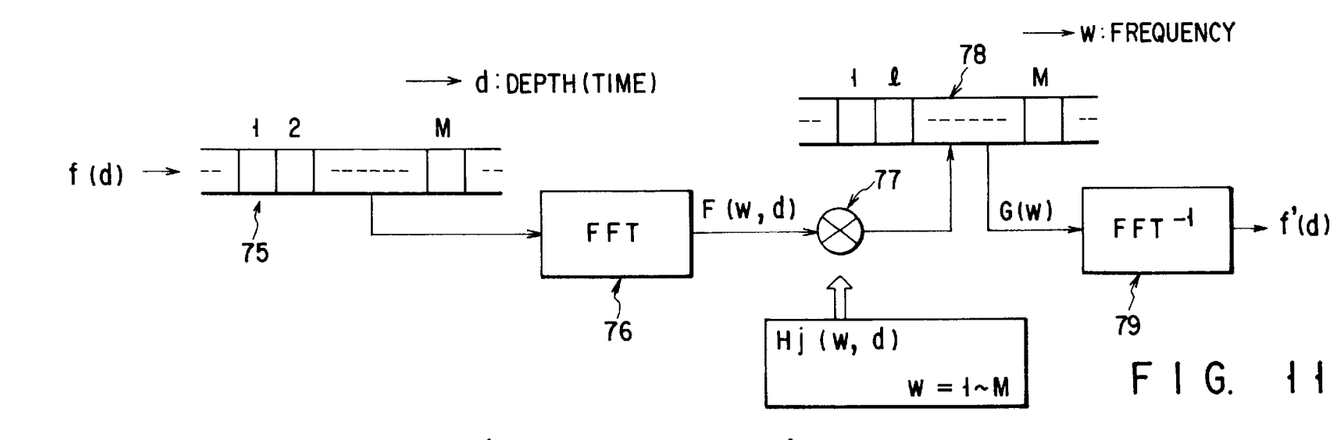
FIG. 11 is a block diagram showing the structure of a spectrum processor of a second embodiment.

FIG. 11 shows the structure of a spectrum processor 7' of the second embodiment. In this embodiment, the shape of the spectrum is corrected by a frequency equalizer. This frequency equalizer is hereinafter called an echo equalizer.

The echo equalizer comprises a signal memory 75, an FFT processor 76, an equalizer 77, a signal memory 78, and an inverse FFT processor 79. The signal memory 75 temporarily stores echo signals f(d) (data items), which are sampled in a depth direction. The FFT processor 76 reads out the data items stored in the signal memory 75 in an M number unit at a time to execute a Fourier transforming process. The equalizer 77 changes the frequency characteristics of frequency data F(ω, d). The signal memory 78 temporarily stores an M number of frequency data G(ω, d) of the result of the equalizer. The inverse FFT processor 79 reads out an M number of frequency data G(ω, d) stored in the signal memory 78 at a time to execute an inverse Fourier transforming process. It is preferable that ASIC be used as the echo equalizer 77 to perform a high-speed calculation.

Figure 12:
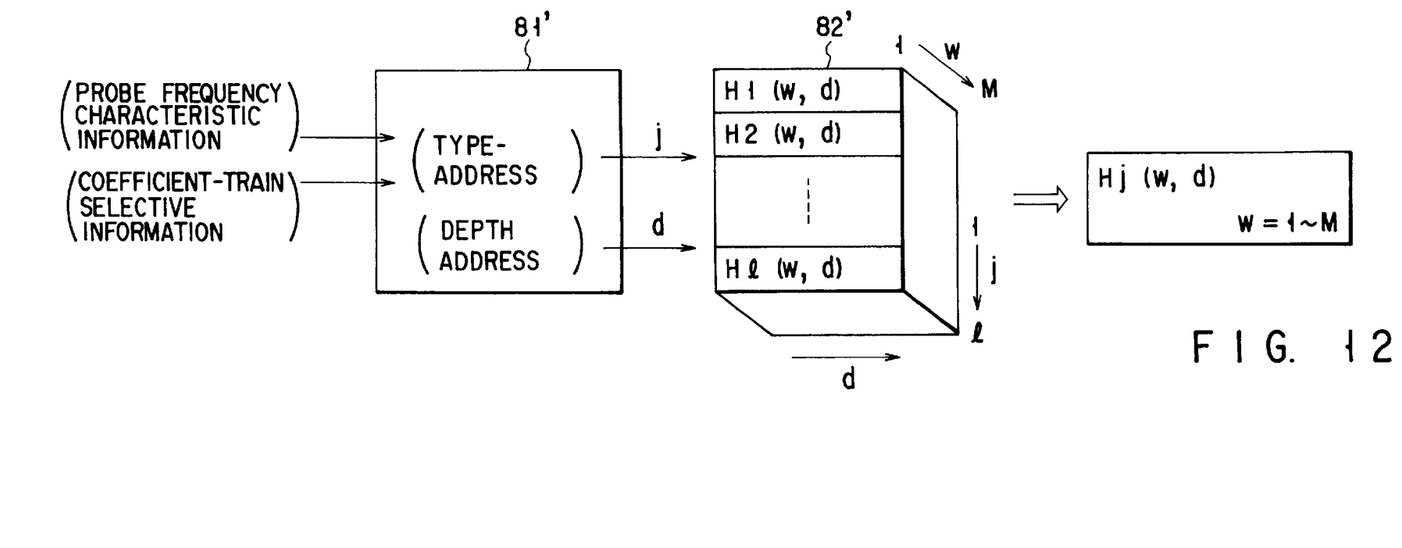
FIG. 12 is a block diagram showing the structure of a coefficient-train generator of the second embodiment.

The frequency characteristic memory section 82' comprises a storage device such as a ROM and a RAM. Then, the frequency characteristic memory section 82' generates a frequency characteristic Hj(ω, d) to the equalizer 77 to correspond to the depth D of the receiving signal based on the control of a system controller 9.

By executing the same control as mentioned above, the frequency coefficient-train Hj(ω, d) is selected from H1(ω, d), H2(ω, d), . . . Hl(ω, d) corresponding to the setting of the coefficient control switch and the kind of the operable ultrasound probe.

Based on the above-explained structure, the multiplication of the frequency characteristic shown by the following equation is executed by the equalizer 77.

$$G(\omega, d) = Jh(\omega, d) \cdot F(\omega, d)$$

wherein ω=1, 2, . . . , M.

Thus, according to the above-mentioned structure, a signal f'(d) in which a desired spectrum correction is made by the calculation on the frequency axis can be obtained.

Similar to the first embodiment, in the second embodiment, the spectrum is approximated to the ideal shape. As a result, as compared with the conventional method for enhancing simply the high-frequency components, the accuracy of correction can be improved. As compared with the first embodiment, complicated processing is needed in the second embodiment However, since the spectrum is directly deformed on the frequency axis, the spectrum can be more closely approximated to the ideal spectrum. The operator can select a suitable type of spectrum as in the first embodiment.

Third Embodiment

Figure 13:
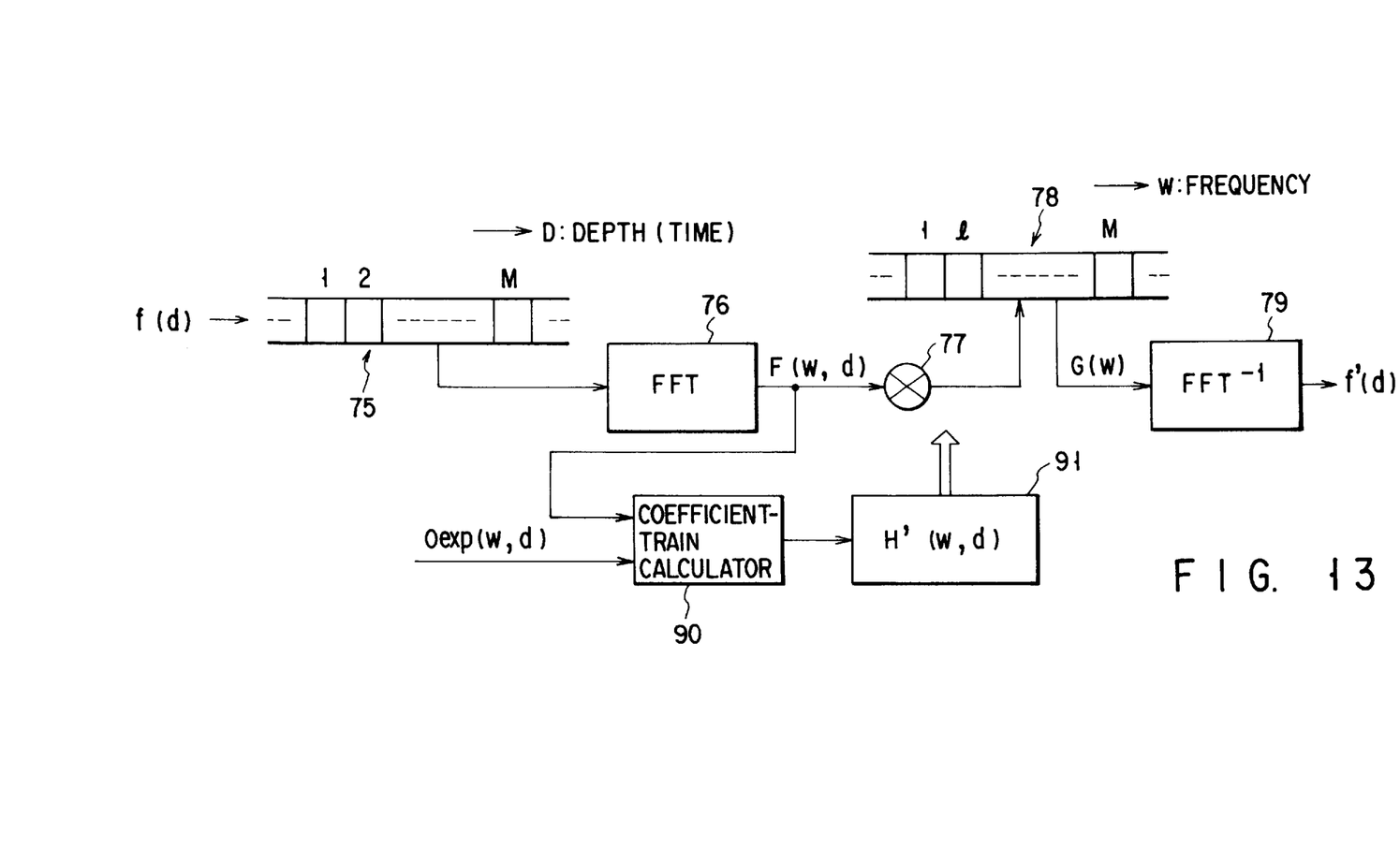
FIG. 13 is a block diagram showing the structure of a spectrum processor of a third embodiment.

According to this embodiments an unsuitable correction, which is-caused by the inconsistency between the actual spectrum of the subject and the standard spectrums can be improved. This improvement can be realized by obtaining the coefficient-train from the actual spectrum of the subject and the ideal spectrum. This embodiment can be applied to the first and second embodiments. The following will explain the case in this embodiment is applied to the second embodiment As shown in FIG. 13 a coefficient-train calculator 90 calculates a suitable coefficient-train H'(ω, d) based on the actual spectrum F(ω, d) and the ideal spectrum Oexp(ω, d).

$$H'(\omega, d) = Oexp(\omega, d)/F(\omega, d)$$

The obtained suitable coefficient-train HI(ω, d) is stored in a memory 91 to be supplied to the multiplier 77. The actual spectrum F(ω, d) is convoluted on the coefficient-train H'(ω, d) by the multiplier 77. As a result, the actual spectrum F(ω, d) is approximated to the ideal spectrum When the subject or the portion to be examined is changed, the calculation of a suitable coefficient-train H'(ω, d) is executed again.

According to this embodiment, the unsuitable correction, which is caused by the inconsistency between the actual spectrum of the subject and the standard spectrum, can be improved.

The invention in its broader aspect is not limited to the specific details and representative devices shown and described herein. Accordingly, various modifications may be made without departing from the spirit or scope of the general inventive concept as defined by the appended claims and their equivalents.

Figure 14:
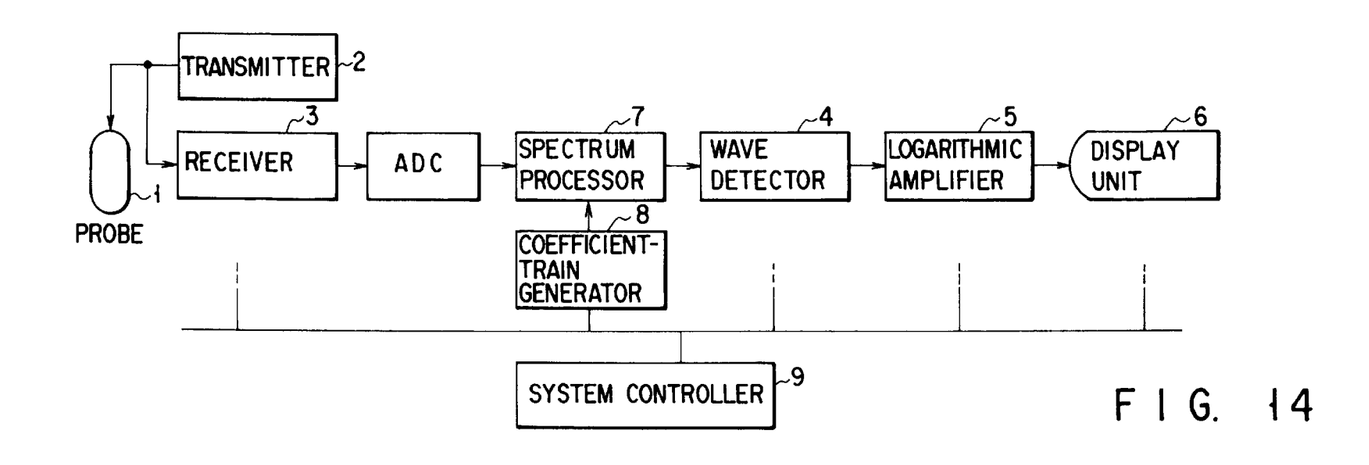
FIG. 14 is a block diagram showing an alternative structure of the ultrasound diagnostic apparatus.
Figure 15:
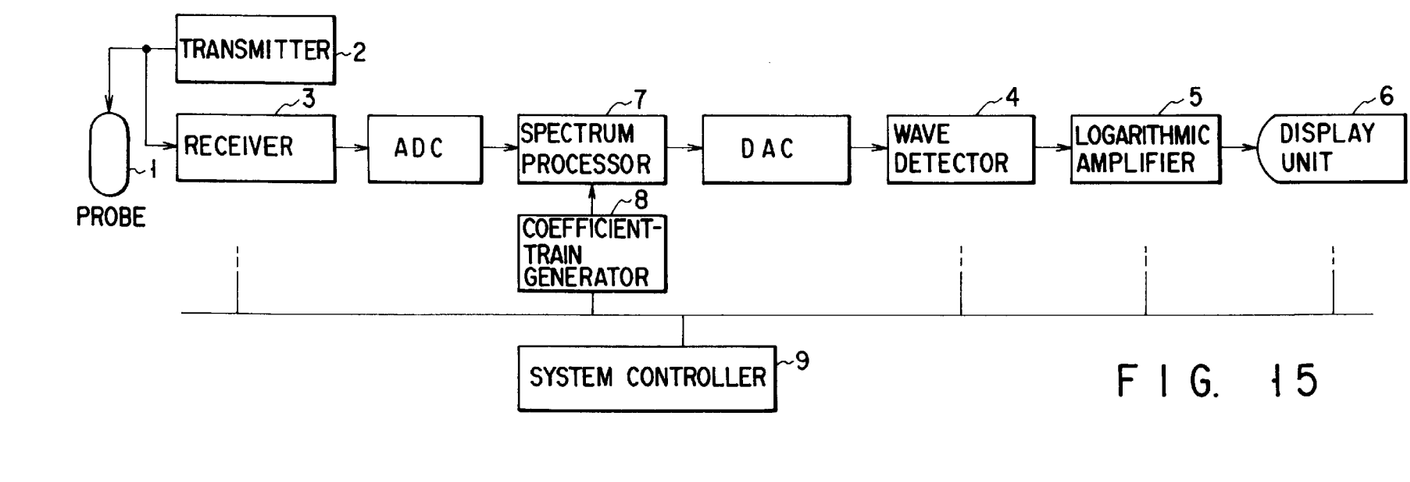
FIG. 15 is a block diagram showing an alternative structure of the ultrasound diagnostic apparatus.

For example, the digital beam former was used to form the echo signal in the above-explained embodiments. However, an analog beam former may be used. In this case, as shown in FIG. 14, an analog/digital converter (ADC) is provided between the receiver 3 and the spectrum processor 7. Moreover, in the above embodiments, the digital circuit was used as each of the wave detector 4 and the logarithmic amplifier 5 comprises the digital circuit. However, the analog circuit may be used. In this case, as shown in FIG. 15, a digital/analog converter (DAC) is provided between the spectrum processor 7 and the detector 4.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

We claim:

1. A method for reconstructing an image based on echo signals, comprising the steps of:

transmitting ultrasound to a subject through an ultrasound probe to receive echo signals from said subject;

generating coefficient trains based on the reflection depth of the ultrasound;

filtering the echo signals based on the coefficient trains to correct a spectrum of the ultrasound; and detecting and logarithmic-amplifying the filtered echo signals to obtain an ultrasound image.

2. The method according to claim 1, wherein the step of filtering comprises the step of:

modifying the spectrum of each of said echo signals to correspond to the predetermined shape on a time axis.

3. The method according to claim 1, wherein the step of filtering comprises the step of:

modifying the spectrum of each of said echo signals to correspond to the predetermined shape on a frequency axis.

4. The method according to claim 1, wherein the step of filtering comprises the step of:

digitally filtering the echo signals based on a standard spectrum and an ideal spectrum.

5. The method according to claim 4, wherein the step of digitally filtering comprises the sub-step of:

setting the standard spectrum equal to an average spectrum obtained from a plurality of subjects.

6. The method according to claim 4, wherein the step of digitally filtering comprises the sub-step of:

expressing the ideal spectrum as a Gaussian function.

7. The method according to claim 1, wherein the step of filtering comprises the steps of:

digitally filtering the echo signals with a digital filter; and changing the filter characteristics of said digital filter in accordance with the reflecting depth.

8. An ultrasound diagnostic apparatus comprising:

an ultrasound probe;

means for transmitting ultrasound to a subject through said ultrasound probe to receive echo signals from the subject;

a coefficient train generator configured to output a coefficient train;

a filter configured to convolute the echo signals with the coefficient train from said coefficient train generator to generate filtered echo signals having a corrected ultrasound spectrum; and means for detecting and logarithmic-amplifying the filtered echo signals to obtain an ultrasound image.

9. The apparatus according to claim 8, wherein said filter is configured to approximate a spectrum of each of said echo signals to a predetermined shape on a time axis to generate the filtered echo signals.

10. The apparatus according to claim 8, wherein said filter is a digital filter.

11. The apparatus according to claim 10, wherein said digital filter is an FIR type digital filter.

12. The apparatus according to claim 10, wherein a filter characteristic of said digital filter is determined based on a standard spectrum and an ideal spectrum.

13. The apparatus according to claim 12, wherein said standard spectrum is an average spectrum of spectrums measured from a plurality of subjects.

14. The apparatus according to claim 13, wherein said digital filter has a multi-peak filter characteristic.

15. The apparatus according to claim 12, wherein said ideal spectrum is expressed by a Gaussian function.

16. The apparatus according to claim 10, wherein said digital filter includes means for changing the filter characteristic of said digital filter in accordance with the reflecting depth of said ultrasound.

17. The apparatus according to claim 10, wherein said digital filter includes means for changing the filter characteristic of said digital filter in accordance with a frequency characteristic of said ultrasound probe.

18. The apparatus according to claim 10, wherein said digital filter includes means for determining the filter characteristic of said digital filter based on the actual spectrum of said echoes and an ideal spectrum.

19. An ultrasound diagnostic apparatus comprising:

an ultrasound probe;

means for transmitting ultrasound to a subject through said ultrasound probe to receive echo signals from the subject;

means for Fourier-transforming the echo signals;

a coefficient train generator configured to output a coefficient train;

a filter configured to multiply the Fourier-transformed echo signals with the coefficient train from said coefficient train generator to generate filtered echo signals having a corrected ultrasound spectrum;

means for inverse Fourier-transforming the filtered echo signals; and means for detecting and logarithmic-amplifying the filtered echo signals to obtain an ultrasound image.

20. The apparatus according to claim 19, wherein said filter is configured to approximate a spectrum of each of said echo signals to a predetermined shape on a frequency axis to generate the filtered echo signals.

* * * * *